United States Patent [19]
Ohfuka et al.

[11] 3,926,930
[45] Dec. 16, 1975

[54] HYGROSCOPIC ACRYLIC SYNTHETIC FIBERS AND METHOD FOR PREPARING THE SAME

[75] Inventors: Toshio Ohfuka; Yoshihisa Schichijo; Yasushi Ichikawa; Katsuo Yamamoto, all of Fuji, Japan

[73] Assignee: Asahi Kasei Kogyo Kabushika Kaisha, Osaka, Japan

[22] Filed: Sept. 6, 1973

[21] Appl. No.: 394,937

Related U.S. Application Data

[63] Continuation-in-part of Ser. No. 138,875, April 30, 1971, abandoned, which is a continuation-in-part of Ser. No. 30,540, April 20, 1970, abandoned.

[30] Foreign Application Priority Data

May 8, 1969 Japan.............................. 44-34782

[52] U.S. Cl. 260/85.5 S; 260/85.5 R; 260/85.5 AM; 260/85.5 N; 260/85.5 B; 260/80.72; 260/65; 260/80.73; 260/79.3 M; 260/63 N
[51] Int. Cl.² ............... C08F 220/48; C08F 224/00; C08F 226/06
[58] Field of Search . 260/85.5 R, 85.5 AM, 85.5 N, 260/85.5 B, 80.72, 80.73, 85.55

[56] References Cited

UNITED STATES PATENTS

| | | | |
|---|---|---|---|
| 2,579,451 | 12/1951 | Polson | 264/182 |
| 3,073,669 | 1/1963 | Fujisaki et al. | 264/182 |
| 3,107,971 | 10/1963 | Yasawa et al. | 264/182 |
| 3,147,322 | 9/1964 | Fujisaki et al. | 264/182 |
| 3,287,304 | 11/1966 | Fujisaki et al. | 260/29.6 AN |
| 3,399,161 | 8/1968 | Ichikawa et al. | 264/182 |
| 3,410,941 | 11/1968 | Dagon | 264/182 |

Primary Examiner—Joseph L. Schofer
Assistant Examiner—Maria S. Tungol
Attorney, Agent, or Firm—Fred Philpitt

[57] ABSTRACT

Acrylonitrile polymer fibers having an improved hygroscopicity are prepared by hydrolyzing an acrylonitrile copolymer comprising 0.5 to 10% by weight of N,N-substituted amide, 0 – 15% by weight of an ethylenically unsaturated compound copolymerizable with acrylonitrile and at least 85% by weight of acrylonitrile in nitric acid to give a degree of hydrolysis as expressed by ODR of 1680 cm$^{-1}$ to 1450 cm$^{-1}$ in the range of 1.2–1.8, followed by conventional wet spinning by using nitric acid as a solvent.

2 Claims, 3 Drawing Figures

INFRARED ABSORPTION SPECTRUM

INFRARED ABSORPTION SPECTRUM

HYGROSCOPIC ACRYLIC SYNTHETIC FIBERS AND METHOD FOR PREPARING THE SAME

This application is a continuation-in-part application of Ser. No. 138,875, filed Apr. 30, 1971, which in turn is a continuation-in-part of Ser. No. 30,540, filed Apr. 20, 1970. Both applications are now abandoned. The benefits of 35 USC 120 are claimed with respect to these prior related applications.

DESCRIPTION OF THE INVENTION

This invention relates to acrylonitrile polymer fibers having excellent chemical and physical properties and practical functions as fibers as well as superior hygroscopicity, and a method for preparing the same. The term acrylonitrile polymer herein referred to is a copolymer prepared from a monomer mixture containing acrylonitrile as a major constituent.

It is necessary and indispensable in order to improve such fiber properties as wearing comfortableness, feel, touch, etc. to improve the hydrophilic and hygroscopic properties of the synthetic fibers. Such a necessity is particularly great in the case of acrylonitrile polymer fibers, because they are widely applied to such articles as underwear, baby wear, socks, blankets, etc. The acrylonitrile fibers containing acrylonitrile as a main component have excellent physical and chemical properties, but their hygroscopicity is especially small among the various fibers and this is a great practical disadvantage.

Many attempts have been made to improve the hygroscopicity of the acrylonitrile polymer fibers, but acrylonitrile polymer fibers having a hygroscopicity comparable with that of the natural fibers, and at the same time, sufficient practical functions as a fiber, have not been discovered yet.

So far proposed hygroscopic synthetic fibers have been prepared by subjecting fibers or knitted or woven cloth, to resin treatment, chemical treatment or graft polymerization of hydrophilic monomers. However, glutinous cohesion between fibers is liable to take place, and the shape, gloss, whiteness, feeling and touch of the fibers are considerably impaired. Water-absorbing property may be endowed thereby, but the true hygroscopicity or permanency is impaired.

Further, in a method for mixing polymers or a spinning dope with a hydrophilic substance or hygroscopic substance, there are only a small number of suitable substances and the permanency has not been satisfied. The spinnability, gloss, feeling and touch have been inevitably lowered.

Furthermore, in the case of fibers composed of a copolymer with a hydrophilic ethylenic unsaturated compound containing a carboxylic acid, sulfonic acid, amines and their salts, hydroxyl group, primary amide, etc., unless a large amount of hydrophilic compound is used, satisfactory hygroscopicity cannot be obtained and the physical properties are degraded and at the same time a considerable glutinous cohesion takes place between the fibers. Therefore, these methods have been difficult to put in practice.

An object of the present invention is to eliminate said disadvantages of the prior art hydrogroscopic synthetic fibers and to provide acrylonitrile polymer fibers having a high hygroscopicity to such a degree that they can satisfy the practical functions of fibers, for example, wearing comfortableness, sweat absorbability, agreeability, etc., and a good fiber form, feeling, touch, physical properties and dyeability.

The acrylonitrile polymer fibers of the present invention comprise acrylonitrile polymer fibers having a moisture regain of 3.0% to 10.0% at a relative humidity of 65% at 20°C, and consist of a nitric acid-hydrolyzate of a polymer comprising at least 85% by weight of acrylonitrile, 0.5–10% by weight of N,N-substituted acryl- or methacrylamide having the general formula of

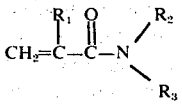

(I)

(wherein $R_1$ represents a hydrogen atom or a methyl group; $R_2$ and $R_3$ represent alkyl groups having 1 to 3 carbon atoms, the sum total of carbon atoms of $R_2$ and $R_3$ being not more than 4 or $R_2$ and $R_3$ being cyclically connected to each other to form a pyrrolidine or morpholine structure) and optionally a balance of an ethylenically unsaturated compound copolymerizable with acrylonitrile, having such a degree of hydrolysis that an amide group of 1680 $cm^{-1}$ is formed in the infrared absorption spectrum and the ODR of 1680 $cm^{-1}$ to 1450 $cm^{-1}$ is in the range of 1.2–1.8.

It has been heretofore well known that acrylonitrile type polymers are hydrolyzed by an acid but hydrolysis greatly reduces the heat stability and mechanical properties of the polymers and also reduces spinnability at the time of fiber production. Accordingly, it has been a conventional procedure to suppress the tendency of hydrolysis as much as possible in prior art. We have found that the acrylonitrile copolymer with the amides represented by a general formula (I) can be hydrolyzed quickly by an acid and its hydrophilic property can be improved thereby, and in spite of such an advantage, the reduction of heat stability and physical properties are very small.

The hydrolysis of the copolymers of acrylonitrile with primary amide or secondary amide such as acrylamide or methacrylamide, N-monosubstituted acrylamide or N-monosubstituted methacrylamide which are considered to be homologs of the amides of the general formula (I), carried out by acid is very slow, improvement of hydrophilic property is small, reduction of heat stability, physical properties and spinnability are large (see Example 2).

When 0.5–10% by weight of the N,N-substituted acrylamide or methacrylamide as represented by the structural formula (I) is contained in the copolymer, a good effect can be attained according to the present invention. If the copolymer contains less than 0.5% by weight of N,N-substituted acrylamide or methacrylamide, the increase in the hydrophilic property is small. If the copolymer contains more than 10% by weight of N,N-substituted acrylamide or methacrylamide, the reduction of physical properties becomes larger and practical functions as fibers are lowered. Therefore, the use of the copolymer containing less than 0.5% or more than 10% by weight of N,N-substituted acrylamide or methacrylamide is not preferable.

Furthermore, when the copolymer contains less than 85% by weight of acrylonitrile, good physical and chemical properties of acrylonitrile polymer fibers cannot be obtained.

When the sum total of the carbon atoms of $R_2$ and $R_3$ of the N,N-substituted acrylamide or methacrylamide as represented by the structural formula (I) is more than 4 in the present invention, the hydrophilic property of the polymer is lowered. Therefore 1 to 4 carbon atoms are preferable.

Amides in case where both of $R_2$ and $R_3$, or either $R_2$ or $R_3$, of N,N-substituted (meth) acrylamide of the formula (I) is hydrogen atom, for example, acrylamide, methacrylamide, N-methylacrylamide, N-methylmethacrylamide, etc. have only a small hydrolysis rate in an acid, and therefore improvement of hygroscopicity is poor, and furthermore the thus obtained fibers show poor heat stability and undergo considerable discoloration, and impairment of physical properties resulting in notable degradation of practical functions as fibers. The N,N-substituted acrylamides or methacrylamides represented by the structural formula (I) in the present invention include the following compounds:

| | |
|---|---|
| $CH_2 = CHCON(CH_3)_2$ | (N,N-dimethylacrylamide) |
| $CH_2 = C-CON(CH_3)_2$ <br>        $\|$ <br>        $CH_3$ | (N,N-dimethylmethacrylamide) |
| $CH_2 = CHCON$ <br>           $C_2H_5$ <br>           $CH_3$ | (N-methyl-N-ethylacrylamide) |
|        $CH_3$ <br> $CH_2 = C-CON$ <br>           $C_2H_5$ | (N-methyl-N-ethyl-methacrylamide) |
| $CH_2 = CHCON(C_2H_5)_2$ <br>        $CH_3$ | (N,N-diethylacrylamide) |
| $CH_2 = C-CON(C_2H_5)_2$ <br>        $\|$ <br>        $CH_3$ | (N,N-diethylmethacrylamide) |
| $CH_2 = CHCON$ <br>           $C_3H_7$ <br>           $CH_3$ | (N-methyl-N-propylacrylamide) |
|        $CH_3$ <br> $CH_2 = C-CON$ <br>           $C_3H_7$ | (N-methyl-N-propyl-methacrylamide) |
| $CH_2 = CHCON$  $\begin{array}{c}CH_2-CH_2\\CH_2-CH_2\end{array}$ | (N-acryloylpyrrolidine) |
|        $CH_3$ <br> $CH_2 = C-CON$  $\begin{array}{c}CH_2-CH_2\\CH_2-CH_2\end{array}$ | (N-methacryloylpyrrolidine) |
| $CH_2 = CHCON$  $\begin{array}{c}CH_2-CH_2\\CH_2-CH_2\end{array}$ O | (N-acryloyl-morpholine) |
|        $CH_3$ <br> $CH_2 = C-CON$  $\begin{array}{c}CH_2-CH_2\\CH_2-CH_2\end{array}$ | (N-methacryloyl-morpholine) |

Of course, it is possible to copolymerize other kinds of ethylenically unsaturated compounds with acrylonitrile and a compound represented by the general formula (I) in a balanced amount.

Examples of the ethylenic unsaturated compounds copolymerizable with acrylonitrile used in the present invention include alkyl acrylates such as methyl acrylate, ethyl acrylate, etc.; alkyl methacrylates such as methyl methacrylate, ethyl methacrylate, etc.; vinyl esters such as vinyl acetate; unsaturated ketones such as methylvinyl ketone, etc.; vinyl ethers; styrene and its alkyl derivatives; vinyl halides such as vinyl chloride, vinyl fluoride, vinyl bromide, vinylidene chloride, etc.; vinylpyridines such as 2-vinylpyridine, 2-methyl-5-vinylpyridine, etc.; N,N-diethylaminoethyl methacrylates; sulfonic acids such as allylsulfonic acid, styrene sulfonic acid and their salts.

The copolymers of the present invention can be prepared according to various well known procedures, and there is no particular limitation thereto.

Even if the copolymers of N,N-substituted acrylamide or methacrylamide as shown by the structural formula (I) and acrylonitrile of the present invention are spun using the well known solvents for the acrylonitrile polymer other than concentrated acids, for example, N,N-dimethylformamide, N,N-dimethylacetamide, dimethylsulfoxide, a concentrated aqueous solution of zinc chloride, a concentrated aqueous solution of rhodanates, etc., no hydrolysis occurs, and hence improvement in the hygroscopicity of the thus obtained fibers can scarcely be observed (reference is made to Example 1).

This fact is due to the notable increase of hydrophilic property by the hydrolysis with acid, of the acrylonitrile polymers of the present invention.

As for acids, those other than nitric acid are also useful, but, from the viewpoint of solubility, spinnability, physical properties, etc., nitric acid is most suitable.

Figure 1:
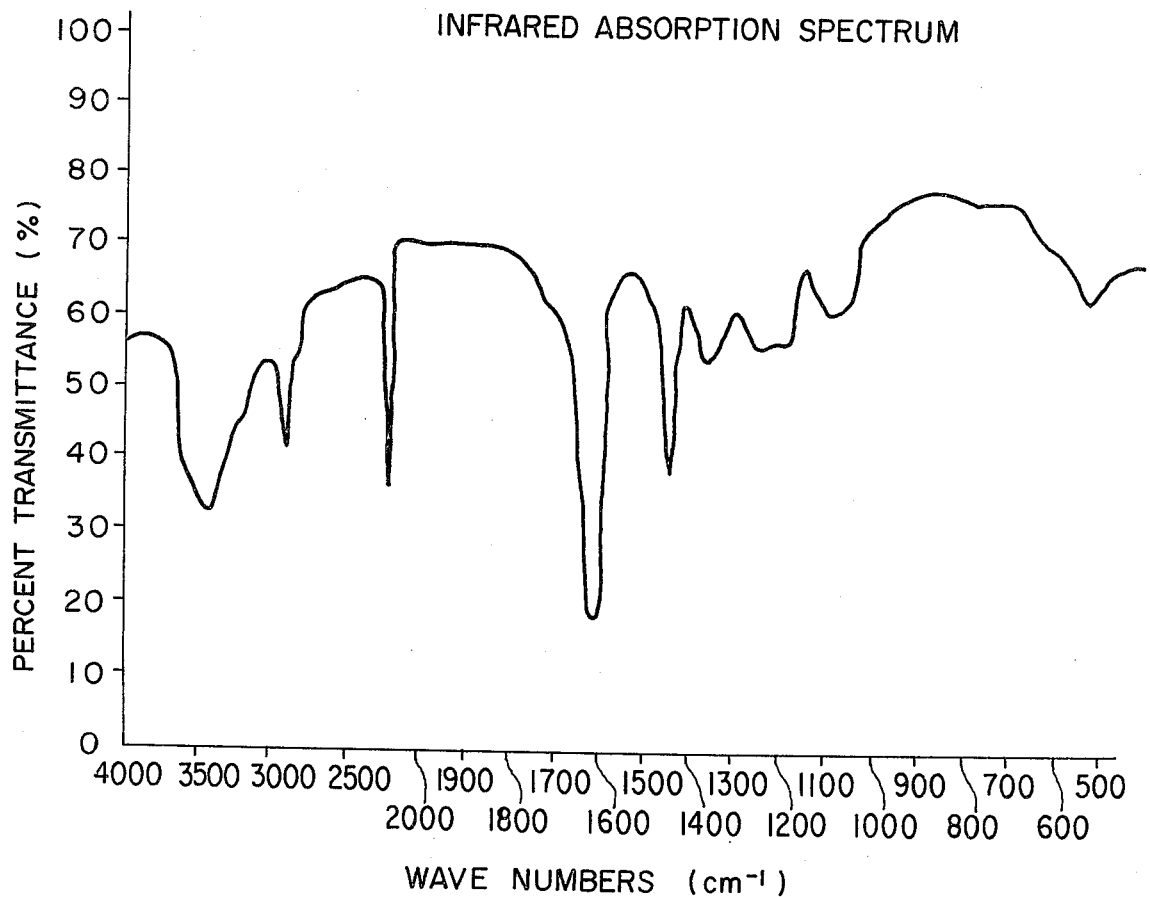
FIG. 1 shows infrared absorption spectra of the copolymer used in the present invention.
Figure 2:
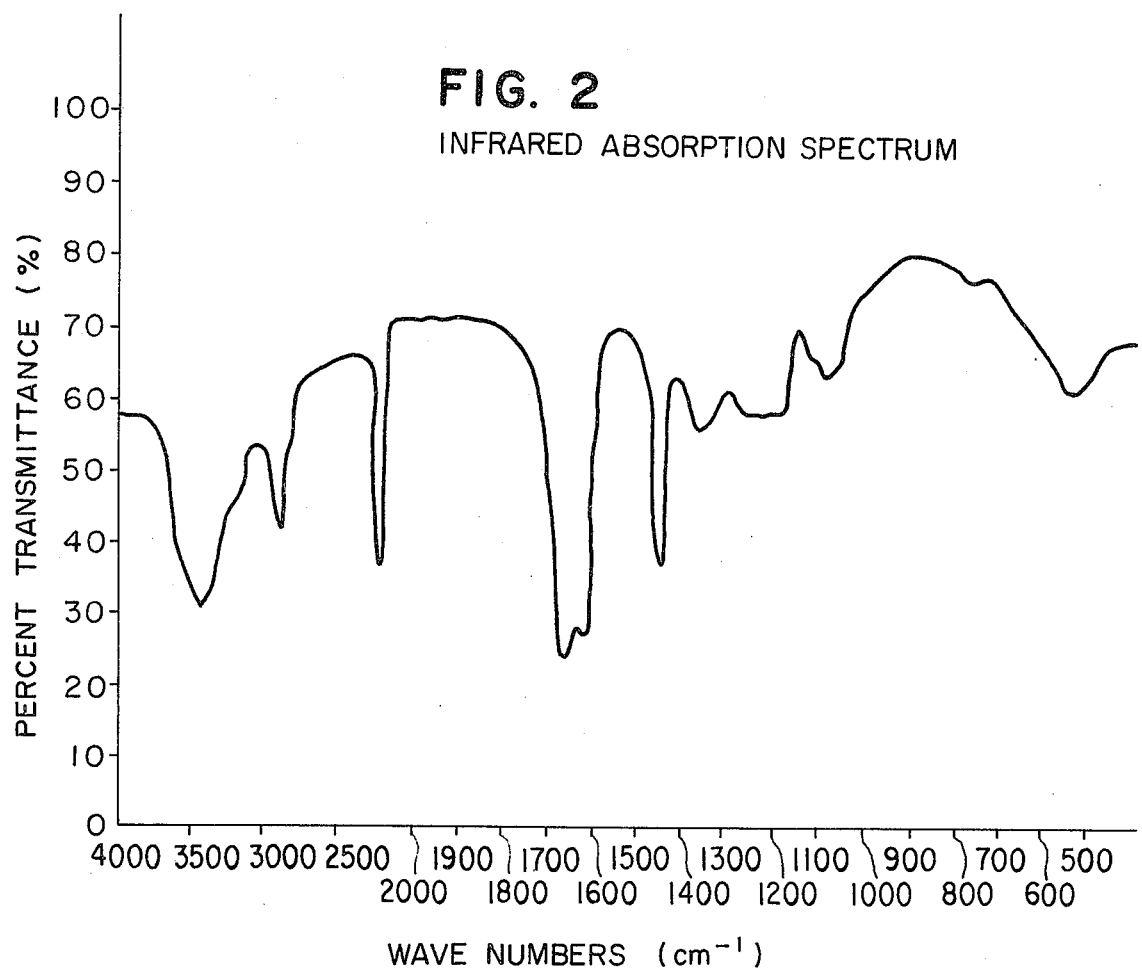
FIG. 2 shows infrared absorption spectra of the fibers obtained by spinning a copolymer by wet process in a nitric acid system.

As shown in the infrared absorption spectra in FIGS. 1 and 2, when the copolymers of the present invention are subjected to acid hydrolysis, the absorptions at 2250 cm$^{-1}$ and 1630 cm$^{-1}$ which are characteristic absorptions of acrylonitrile and the amides represented by the general formula (I), are reduced, and a new characteristic absorption which has not been observed before hydrolysis appears at 1680 cm$^{-1}$.

The hydrolysis mechanism and hydrolyzed product have not all been clarified yet. However, it is presumed from the fact that the nitrile groups of the fibers after hydrolysis are less than those of the original polymer, that the hydrolysis product be that formed by the reaction of the nitrile groups adjacent to the amide expressed by the formula (I), with the amide expressed by the formula (I), followed by hydrolysis. Further, in this hydrolysis, it is presumed that the amides expressed by the formula (I) are hydrolyzed easier than primary or secondary amides, due to an autocatalysis in the presence of acid, since the electronegativity of the nitrogen atom of the N,N-substituted amides expressed by the formula (I) is higher than those of primary or secondary amides due to the electron inductive effect of the alkyl group.

The characteristic absorption at 1680 cm$^{-1}$ formed by the hydrolysis is in accordance with the characteristic absorption of acrylamide, but even when it is assumed that the hydrolysis product be an acrylamide, and a polymer is prepared by copolymerizing acrylonitrile, acrylamide and N,N-dimethylacrylamide so as to give the infrared absorption spectra and absorbance identical with those of the hydrolysis product of the present invention and the resulting polymer is spun with N,N-dimethylformamide, the moisture regain of the thus obtained fibers is remarkably smaller than that of the hydrolysis product (see Comparative Example 1). It seems from this fact that the hydrolysis product may be a hydrophilic substance other than the acrylamide, but even if it is acrylamide, the arrangement of the acrylamide formed by the hydrolysis in the polymer chain is different from that obtained by the copolymerization, which results in the difference of hygroscopic property and physical properties. Further, the homopolymer of the amide represented by the general formula (I) hardly undergoes hydrolysis in contrast to its copolymer with acrylonitrile. It is really surprising that the effect of the present invention can be attained only by the acid hydrolysis of the copolymer of acrylonitrile and the amide represented by the general formula (I).

In the hydrolysis of the copolymers of acrylonitrile and the amide represented by the general formula (I), of the present invention, the degree of acid hydrolysis must be limited as hereinafter defined so as to satisfy the object of the present invention. If the degree of acid hydrolysis is small, the increase of hygroscopicity is insufficient, and a too large degree of acid hydrolysis is not preferable, because physical properties of fibers are reduced.

The degree of acid hydrolysis of the present invention can be expressed by the Optical Density Ratio (hereinafter referred to as ODR) of the characteristic absorption of the infrared spectrum.

Figure 3:
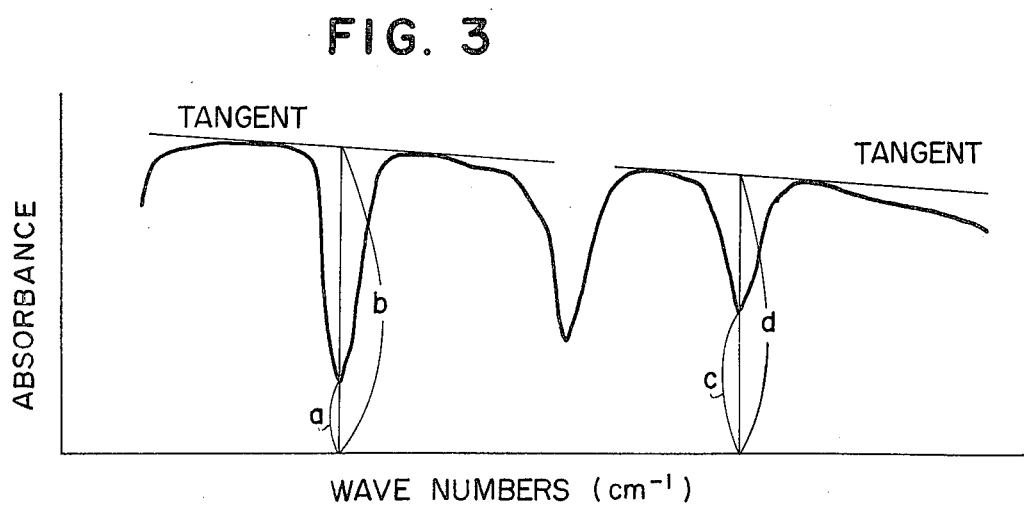
FIG. 3 is a figure illustrating ODR (optical density ratio) employed in the present invention.

Optical Density Ratio (ODR) is a ratio of optical densities of each characteristic absorption e.g. a ratio of log $(b/a)$ : log $(d/c)$ in FIG. 3. In case of the present invention, the absorption of —CH$_2$—, 1450 cm$^{-1}$, which does not change before and after the hydrolysis, is selected as a standard value. The infrared absorption spectra herein referred to were measured using Hitachi GP-II type spectrograph according to KBr tablet method with the amount of sample of 2 mg/200 mgKBr.

As for the degree of hydrolysis in the present invention, it is preferable that the ODR of absorption at 1680 cm$^{-1}$, of amide formed by hydrolysis to absorption of methylene group at 1450 cm$^{-1}$ be in the range of 1.2 to 1.8. If ODR is smaller than 1.2, the degree of hydrolysis is not sufficient, hygroscopicity is low and not satisfactory for the object of the present invention. If ODR is greater than 1.8, the amount of amide is larger, which results in the reduction of physical properties of fibers and degradation of heat stability. The degree of hydrolysis in this range gives a moisture regain in the range of 3.0–10.0% at 20°C and 65% R.H.

Even in case of polymers other than the copolymers of acrylonitrile with amides expressed by the general formula (I), of the present invention, such as copolymer of acrylonitrile with acrylamide or acrylonitrile homopolymer, it is possible to bring the ODR to a value in the range of the present invention by acid hydrolysis, but the resultant moisture regain is always low and does not reach the expected value of the present invention.

When the degree of hydrolysis is larger over the ODR value of the present invention, moisture regain greater than 3% can be attained but the reduction of fiber properties is remarkable and degradation is so great that their commercial value is lost.

The hydrolysis conditions are selected depending upon the copolymerized amount of the amide represented by the general formula (I) in the copolymers of acrylonitrile with the amide represented by the general formula (I).

As for the concentration of nitric acid, 55 – 85% is preferable. If it is lower than 55%, the solubility of the copolymer is bad, and if it is higher than 85%, whiteness of hydrolysis product becomes worse due to evolution of nitrous acid. This is not preferable.

As for the temperature of hydrolysis, when a temperature of 10°C or higher is selected, hydrolysis can be carried out using only a small copolymerized amount of the amide represented by the general formula of (I) and within a short period of time.

For the production of fibers, the nitric acid solution of hydrolysis product after the acid hydrolysis, as it is, can be used as a spinning solution and a conventional nitric acid spinning process can be employed.

Now, the present invention will be explained, referring to non-limitative Examples.

Example 1

A. 3750 g. of acrylonitrile, 250 g. of N,N-dimethylacrylamide and 50 l of water were added to a 100 l capacity polymerization reactor with a stirrer and mixed together. Then, 40 g. of ammonium persulfate and 200 g. of sodium hydrogen sulfite were added thereto and the resulting mixture was adjusted to pH 2.8 with sulfuric acid. Then, the polymerization reaction was carried out at 60°C for 5 hours. The resulting copolymer was thoroughly washed with water, dehydrated and dried at 70°C for 10 hours.

The resulting polymer contained 94.3% by weight of acrylonitrile and 5.7% by weight of N,N-dimethylacrylamide (polymer a).

The polymer a was dissolved in 65% nitric acid at 0°C to make its concentration 16% by weight. After the resulting solution was kept at 0°C for 3 hours, the temperature of the solution was elevated to 20°C at which temperature hydrolysis was carried out for 12 hours. Thereafter the solution was cooled to −5°C, and then extruded from spinning nozzles (100 holes × 0.08 mm$\phi$) into a 30% aqueous nitric acid solution at 0°C to coagulate the resulting extrudate. After water washing, the extruded fibers were stretched to 8 times the original length in boiling water and dried. Then, the fibers were subjected to wet heat treatment at 120°C thereby to form fibers of 3 deniers.

Infrared absorption spectra of the polymer a and the fibers obtained by the nitric acid hydrolysis and the wet spinning in the nitric acid system are given in FIGS. 1 and 2.

Separately, the polymer a was dissolved in dimethylformamide at 40°C to give a concentration of 17% by weight. The resulting solution was extruded into a 50% aqueous dimethylformamide solution at 30°C, washed with water, stretched to 8 times the original length in boiling water, dried and then subjected to wet heat-treatment at 120°C thereby to form fibers of 3 deniers.

The physical properties of the resulting fibers at 20°C and a relative humidity (R.H.) of 65% are given below:

| Acid treatment | Dry strength g/d | Wet strength g/d | Moisture regain % | ODR (1680cm⁻¹/ 1450cm⁻¹) | Remarks |
|---|---|---|---|---|---|
| Yes | 3.02 | 2.45 | 6.27 | 1.41 | Example of the present invention |
| None | 3.36 | 2.71 | 1.88 | 0 | Comparative Example |

The fibers obtained by the hydrolysis were rich in gloss and flexibility and had a cool feeling when touched with hands.

The moisture regain referred to in the present invention is given according to the following measuring method:

Fibers of sample are scoured and then dried at 70°C and under a reduced pressure of 700 mm Hg till the weight reaches a constant value. The resulting dry weight is weighed. After drying, the fibers are allowed to stand for one week in a desiccator containing a saturated aqueous solution of sodium nitrite (R.H. : 65%). Thereafter the weight is again weighed (wet weight). Moisture regain is given according to the following equation:

$$\text{Moisture regain} = \frac{(\text{Wet weight of fibers}) - (\text{Dry weight of fibers})}{(\text{Dry weight of fibers})} \times 100 \, (\%)$$

Example 2

Polymers having the following compositions were prepared in the same polymerization method as in Example 1:

| Polymer b | Acrylonitrile | 95.1% |
|---|---|---|
| | N,N-dimethylmethacrylamide | 4.9% |

| | -continued | |
|---|---|---|
| Polymer c | Acrylonitrile | 94.9% |
| | N-methylacrylamide | 5.1% |
| Polymer d | Acrylonitrile | 95.1% |
| | Acrylamide | 4.9% |
| Polymer e | Acrylonitrile | 100.0% |

Each of these polymers was dissolved in 70% nitric acid at 15°C to give a concentration of 15% by weight, at which temperature hydrolysis was carried out for 18 hours. Thereafter the resulting solution was cooled to 0°C and then extruded from spinning nozzles (100 holes × 0.08 mm$\phi$) into a 35% aqueous nitric acid at 0°C to coagulate the extrudate. After water washing, the extruded fibers were stretched to 7 times the original length in boiling water, and dried. Then the fibers were subjected to wet heat treatment at 110°C to form fibers of 5 deniers.

The physical properties of the resulting fibers at 20°C and 65% relative humidity were as follows:

| Polymer | Dry strength g/d | Wet strength g/d | Moisture regain % | ODR (1680cm⁻¹/ 1450cm⁻¹) | Hunter whiteness | Remarks |
|---|---|---|---|---|---|---|
| b | 2.97 | 2.50 | 4.75 | 1.44 | 63.5 | Example of the present invention |
| c | 2.83 | 2.26 | 3.99 | 1.02 | 56.7 | Comparative Example |
| d | 2.54 | 1.89 | 2.78 | 1.60 | 49.2 | Comparative Example |
| e | 2.02 | 1.43 | 2.01 | 0.53 | 47.8 | Comparative Example |

Hunter's whiteness referred to in the present invention is given as follows:

$$\text{Hunter's whiteness} = 100 - \sqrt{(100-L)^2 + a^2 + b^2}$$

wherein L means brightness and a $a$ is expressed by the color tone of red-green and $b$ by that of yellow-blue.

The fibers obtained from the polymer b of the present invention were good in both moisture regain and whiteness. Whereas, the fibers obtained from the polymer c and polymer e, were both low in ODR and moisture regain and also bad in whiteness. The fibers obtained from the polymer d were low in moisture regain and bad in whiteness in spite of high ODR.

Example 3

Polymers having the following compositions were prepared in the same manner as in Example 1:

| Polymer | N,N-dimethylacrylamide | Acrylonitrile |
|---|---|---|
| f | 0.3% | 99.7% |
| g | 0.7% | 99.3% |
| h | 9.5% | 90.5% |
| i | 11.9% | 88.1% |

Each of these polymers was subjected to nitric acid hydrolysis under the conditions described in the following Table, and then spun in the same manner as in Example 1 to give fibers of 3 deniers. The physical properties of the resulting fibers at 20°C and 65% relative humidity are shown in the next Table.

Table

| No. | Polymer | Conditions of hydrolysis | Dry strength g/d | Wet strength g/d | ODR 1680cm$^{-1}$/1450cm$^{-1}$ | Moisture regain % | Hunter's whiteness | Remarks |
|---|---|---|---|---|---|---|---|---|
| 1 | f | 70% HNO$_3$ 20°C×20hrs. | 2.56 | 2.07 | 0.78 | 2.27 | 52.4 | Comparative Example |
| 2 | ditto | 70% HNO$_3$ 30°C×20hrs. | 2.11 | 1.53 | 1.11 | 2.62 | 47.5 | ditto |
| 3 | ditto | 70% HNO$_3$ 40°C×20hrs. | 1.62 | 1.02 | 1.45 | 2.93 | 42.1 | ditto |
| 4 | g | 70% HNO$_3$ 20°C×20hrs. | 2.88 | 2.36 | 1.04 | 2.95 | 55.2 | ditto |
| 5 | ditto | 70% HNO$_3$ 30°C×20hrs. | 2.53 | 2.27 | 1.29 | 3.51 | 52.3 | Example of the present invention |
| 6 | h | 65% HNO$_3$ 10°C×20hrs. | 2.76 | 2.63 | 1.45 | 4.85 | 61.9 | ditto |
| 7 | ditto | 65% HNO$_3$ 20°C×20hrs. | 2.59 | 2.32 | 1.59 | 8.05 | 60.1 | ditto |
| 8 | i | 65% HNO$_3$ 10°C×20hrs. | 2.48 | 1.97 | 1.73 | 6.25 | 60.7 | Comparative Example |
| 9 | ditto | 65% HNO$_3$ 15°C×20hrs | 2.11 | 1.69 | 1.82 | 7.98 | 58.3 | ditto |

According to Experiments Nos. 1 and 2, the resulting fibers were low in both ODR and moisture regain and also bad in whiteness due to the small copolymerized amount of the comonomer expressed by the general formula (I), in spite of the fact that they were hydrolysis products. As for No. 3, the ODR was increased up to a given value of the present invention by employing severe conditions of hydrolysis, but the moisture regain was still low due to the small copolymerized amount of the comonomer expressed by the general formula (I), and a hydrolysis other than that caused by the structure of the formula (I) occurred due to the severe conditions of hydrolysis, which results in a higher ODR, but degradations in the physical properties and whiteness were remarkable. As for No. 4, although the copolymerized amount of the comonomer expressed by the general formula (I) fell within the range of the present invention, the ODR and moisture regain were both low due to the still small copolymerized amount. Thus, the hydrolysis conditions must be made severer up to those of No. 5. However, when the copolymerized amount of the comonomer expressed by the formula (I) is small, the whiteness is reduced by the conditions of hydrolysis made severe due to the small amount, and hence it is preferable that the copolymerized amount is 3% or more. Nos. 6 and 7 are Examples of the present invention. As for No. 8, the ODR and moisture regain reached a given value of the present invention due to the large copolymerized amount, but reduction in strength was great due to the large copolymerized amount, and also the balance of performances of fibers was broken. As for No. 9, reduction in strength was similarly remarkable.

Example 4

A copolymer consisting of 93.7% by weight of acrylonitrile and 6.3% by weight of acryloyl morpholine prepared in the same manner as in Example 1, was subjected to hydrolysis for 12 hours in a 75% nitric acid at 20°C. After cooling, the resulting solution was extruded from spinning nozzles (100 holes × 0.06 mmφ) into a 35% nitric acid aqueous solution to coagulate the extrudate. After water washing, the resulting fibers were stretched to 7 times the original length by heating with steam. After drying, they were heat-treated at 110°C to obtain fibers of 2 deniers. The physical properties of the resulting fibers at 20°C and 65% relative humidity were as follows:

| | |
|---|---|
| ODR | 1.48 |
| Moisture regain | 7.15% |
| Dry strength | 3.03 |
| Wet strength | 2.76 |
| Hunter's whiteness | 61.7 |

What is claimed is:

1. A polymer hydrolyzate produced by hydrolyzing with nitric acid a polymer comprising at least 85% by weight of acrylonitrile, 0.5 – 10% by weight of N,N-substituted acryl- or methacryl-amide having the general formula of

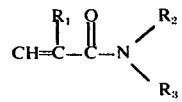

(wherein $R_1$ represents a hydrogen atom or a methyl group; $R_2$ and $R_3$ represent alkyl groups having 1 to 3 carbon atoms, the sum total of carbon atoms of $R_2$ and $R_3$ being not more than 4, or $R_2$ and $R_3$ being cyclically connected to each other to form a pyrrolidine or morpholine structure) and 0 – 15% by weight of a compound selected from the group consisting of methyl acrylate, ethyl acrylate, methyl methacrylate, ethyl methacrylate, vinyl acetate, methyl vinyl ketone, styrene, vinyl chloride, vinyl fluoride, vinyl bromide, vinylidene chloride, 2-vinylpyridine, 2-methyl-5-vinylpyridine, N,N-diethylaminoethyl methacrylates, allylsulfonic acid and styrene sulfonic acid, the hydrolysis being carried out to such a degree that an amide group of 1680 cm$^{-1}$ is formed in the infrared absorption spectrum and the ODR of 1680 cm$^{-1}$ to 1450 cm$^{-1}$ is in the range of 1.2 – 1.8, said polymer hydrolyzate having a moisture regain of 3.0 % to 10% at a relative humidity of 65% at 20°C.

2. Fibers of acrylonitrile polymers according to claim 1 wherein said N,N-substituted acryl- or methacryl-amide is N,N-dimethylacrylamide or N,N-dimethylmethacrylamide.

* * * * *